United States Patent
Brendelson et al.

(10) Patent No.: US 11,027,786 B2
(45) Date of Patent: Jun. 8, 2021

(54) GYROSCOPIC RIDER ASSIST DEVICE

(71) Applicant: Harley-Davidson Motor Company Group, LLC, Milwaukee, WI (US)

(72) Inventors: James C. Brendelson, Milwaukee, WI (US); Mason del Rosario, Davis, CA (US); Sean Karagianes, Somerville, MA (US); Sean Lowen, Somerville, MA (US); Michael Searing, Renton, WA (US); Ben Smith, Sunnyvale, CA (US); Paul Titchener, Cambridge, MA (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 280 days.

(21) Appl. No.: 16/196,067

(22) Filed: Nov. 20, 2018

(65) Prior Publication Data

US 2020/0156717 A1    May 21, 2020

(51) Int. Cl.
   *B62D 37/06*    (2006.01)

(52) U.S. Cl.
   CPC .................................... *B62D 37/06* (2013.01)

(58) Field of Classification Search
   CPC ...................................................... B62D 37/06
   See application file for complete search history.

(56) References Cited

U.S. PATENT DOCUMENTS

| | | | |
|---|---|---|---|
| 1,362,024 A | 12/1920 | McKee | |
| 3,124,007 A | 3/1964 | Swinney | |
| 3,236,323 A | 2/1966 | Austin | |
| 3,373,832 A | 3/1968 | Summers | |
| 3,756,338 A | 9/1973 | Goodridge | |
| 3,897,842 A | 8/1975 | Rheaume et al. | |
| 4,691,798 A | 9/1987 | Engelbach | |
| 5,048,864 A | 9/1991 | Geiger | |
| 5,181,740 A | 1/1993 | Horn | |
| 5,257,671 A | 11/1993 | Watkins | |
| 5,711,390 A | 1/1998 | Hikichi et al. | |

(Continued)

FOREIGN PATENT DOCUMENTS

| | | |
|---|---|---|
| WO | WO9843873 A1 | 10/1998 |
| WO | WO0034112 A1 | 6/2000 |

(Continued)

OTHER PUBLICATIONS

Honda, "Honda Just Invented a Self-Balancing Motorcycle That Never Falls Over", https://www.roadandtrack.com/new-cars/car-technology/news/a32162/honda-just-invented-a-self-balancing-motorcycle-that-never-falls-over/ by Bob Sorokanich, Jan. 5, 2017.

(Continued)

*Primary Examiner* — Kevin Hurley
(74) *Attorney, Agent, or Firm* — Michael Best & Friedrich LLP

(57) ABSTRACT

A tilting vehicle includes a frame and a front wheel coupled to the frame. A rear wheel is coupled to the frame and positioned rearward of the front wheel in a longitudinal direction. A seating area includes at least one seat positioned to support a rider between the front wheel and the rear wheel. A gyroscopic rider assist device is provided within an enclosure behind the seating area and above the rear wheel.

22 Claims, 5 Drawing Sheets

(56) References Cited

U.S. PATENT DOCUMENTS

| | | | |
|---|---|---|---|
| 5,820,439 A * | 10/1998 | Hair, III | A63H 17/16 |
| | | | 446/233 |
| 5,931,245 A | 8/1999 | Uetake et al. | |
| 5,960,900 A | 10/1999 | Cheng | |
| 6,360,838 B1 | 3/2002 | Kulhavy | |
| 8,139,810 B2 | 3/2012 | Armitage et al. | |
| 8,235,419 B1 | 8/2012 | Giarrusso | |
| 8,388,005 B2 | 3/2013 | Kim et al. | |
| 8,532,915 B2 * | 9/2013 | Kim | B62K 11/00 |
| | | | 701/124 |
| 8,706,390 B2 | 4/2014 | Kim et al. | |
| 8,919,788 B2 | 12/2014 | Kim et al. | |
| 8,930,128 B2 | 1/2015 | Kim et al. | |
| 9,061,576 B2 | 6/2015 | Kim et al. | |
| 9,273,961 B2 | 3/2016 | Kim | |
| 9,302,730 B2 | 4/2016 | Takenaka et al. | |
| 9,310,808 B2 | 4/2016 | Shankwitz et al. | |
| 9,434,431 B2 | 9/2016 | Kim et al. | |
| 10,689,047 B2 * | 6/2020 | Krylatov | B62H 7/00 |
| 2002/0040821 A1 | 4/2002 | Domenicali et al. | |
| 2003/0010554 A1 | 1/2003 | Grong et al. | |
| 2004/0098185 A1 | 5/2004 | Wang | |
| 2004/0256835 A1 | 12/2004 | Royal, Sr. et al. | |
| 2005/0034910 A1 | 2/2005 | Hinton | |
| 2005/0035583 A1 | 2/2005 | Hinton | |
| 2005/0045398 A1 | 3/2005 | Suzuki | |
| 2006/0054375 A1 | 3/2006 | Kakinuma | |
| 2006/0175110 A1 | 8/2006 | Lin | |
| 2007/0010919 A1 | 1/2007 | Ammon | |
| 2007/0102217 A1 | 5/2007 | Kimura | |
| 2008/0006498 A1 | 1/2008 | Simmons | |
| 2008/0046159 A1 | 2/2008 | Baijens et al. | |
| 2008/0295595 A1 | 12/2008 | Tacklind et al. | |
| 2009/0076684 A1 | 3/2009 | Seidl | |
| 2009/0099762 A1 | 4/2009 | Heinzmann et al. | |
| 2009/0139793 A1 | 6/2009 | Suzuki | |
| 2010/0023235 A1 | 1/2010 | Kremer et al. | |
| 2010/0274445 A1 | 10/2010 | Haynes | |
| 2011/0163516 A1 | 7/2011 | Whinnery | |
| 2011/0172881 A1 | 7/2011 | Seidel et al. | |
| 2011/0231041 A1 | 9/2011 | Kim et al. | |
| 2012/0031696 A1 | 2/2012 | Wagner | |
| 2012/0072099 A1 | 3/2012 | Ahlstedt et al. | |
| 2012/0073891 A1 | 3/2012 | Kim et al. | |
| 2013/0054126 A1 | 2/2013 | Lazzari | |
| 2013/0090828 A1 | 4/2013 | Lemejda | |
| 2013/0233100 A1 | 9/2013 | Kim | |
| 2013/0233632 A1 | 9/2013 | Kim et al. | |
| 2013/0238233 A1 | 9/2013 | Kim et al. | |
| 2013/0274995 A1 * | 10/2013 | Kim | B62J 27/00 |
| | | | 701/36 |
| 2014/0054867 A1 | 2/2014 | Kim et al. | |
| 2014/0058624 A1 | 2/2014 | Muth | |
| 2014/0129086 A1 | 5/2014 | Takenaka et al. | |
| 2014/0129088 A1 | 5/2014 | Takenaka et al. | |
| 2014/0188341 A1 | 7/2014 | Takenaka et al. | |
| 2014/0188342 A1 | 7/2014 | Takenaka et al. | |
| 2014/0200780 A1 | 7/2014 | Watanabe et al. | |
| 2014/0260233 A1 | 9/2014 | Giovanardi et al. | |
| 2014/0262581 A1 | 9/2014 | Whinnery | |
| 2014/0277895 A1 | 9/2014 | Shankwitz et al. | |
| 2014/0284899 A1 | 9/2014 | Takenaka et al. | |
| 2015/0105938 A1 | 4/2015 | Seki | |
| 2015/0166099 A1 | 6/2015 | Kim et al. | |
| 2015/0203110 A1 | 7/2015 | Moerbe | |
| 2015/0314781 A1 | 11/2015 | Klews et al. | |
| 2015/0353151 A1 | 12/2015 | Klews | |
| 2016/0161526 A1 | 6/2016 | Miki | |
| 2016/0368546 A1 | 12/2016 | Wahl et al. | |
| 2017/0043831 A1 | 2/2017 | Zhu | |
| 2017/0088160 A1 | 3/2017 | Mori et al. | |
| 2017/0088161 A1 | 3/2017 | Mori et al. | |
| 2017/0088228 A1 | 3/2017 | Mori et al. | |
| 2017/0088229 A1 | 3/2017 | Mori et al. | |
| 2020/0102043 A1 * | 4/2020 | Zhang | B62K 21/00 |

FOREIGN PATENT DOCUMENTS

| | | |
|---|---|---|
| WO | WO0162580 A1 | 8/2001 |
| WO | WO03074343 A3 | 9/2003 |
| WO | WO08072043 A1 | 12/2006 |
| WO | WO07087255 A2 | 8/2007 |
| WO | WO12092182 A1 | 7/2012 |
| WO | WO13175680 A1 | 11/2013 |
| WO | WO15101114 A1 | 7/2015 |
| WO | WO16026356 A1 | 2/2016 |
| WO | WO17024472 A1 | 2/2017 |
| WO | WO17028999 A1 | 2/2017 |
| WO | WO17071882 A1 | 5/2017 |

OTHER PUBLICATIONS

BMW, "Vision Next 100" https://www.brand.bmw-motorrad.com/en/experience/stories/brand/vision-next-100.html, published prior to Nov. 20, 2018.

Fleming, "Gyroscopic stabilisers for powered two wheeled vehicles", International Journal of Vehicle Mechanics and Mobility, https://doi.org/10.1080/00423114.2018.1506588, Published online Aug. 20, 2018.

* cited by examiner

GYROSCOPIC RIDER ASSIST DEVICE

BACKGROUND

The present invention relates to gyroscopic devices in tilting vehicles.

SUMMARY

In one aspect, the invention provides a tilting vehicle including a frame, a front wheel coupled to the frame, a rear wheel coupled to the frame and positioned rearward of the front wheel in a longitudinal direction, a seating area including at least one seat positioned to support a rider between the front wheel and the rear wheel, and a gyroscopic rider assist device provided within an enclosure behind the seating area and above the rear wheel.

In another aspect the invention provides a tilting vehicle including a frame, a front wheel coupled to the frame and aligned with the front wheel in a longitudinal direction to define a single track of the vehicle, a rear wheel coupled to the frame and aligned with the front wheel, and a gyroscopic rider assist device operable to output a corrective moment on the vehicle in response to an input from an actuator. A clutch is provided between the actuator and the gyroscopic rider assist device to selectively deactivate the gyroscopic rider assist device upon transition from a first condition of the vehicle to a second condition of the vehicle.

In another aspect, the invention provides a method of operating a tilting vehicle including operating the vehicle at a first speed at or below a threshold speed, during operation at the first speed, engaging a gyroscopic rider assist device which allows a flywheel to precess, and the gyroscopic rider assist device to exert a corrective moment on the vehicle, accelerating the vehicle to a second speed exceeding the threshold speed, and decoupling a clutch in response to exceeding the threshold speed to transition the gyroscopic rider assist device into a non-operation state in response to the vehicle exceeding the threshold speed, wherein the non-operation state prevents the gyroscopic rider assist device from exerting a corrective moment and other gyroscopic reaction forces on the vehicle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
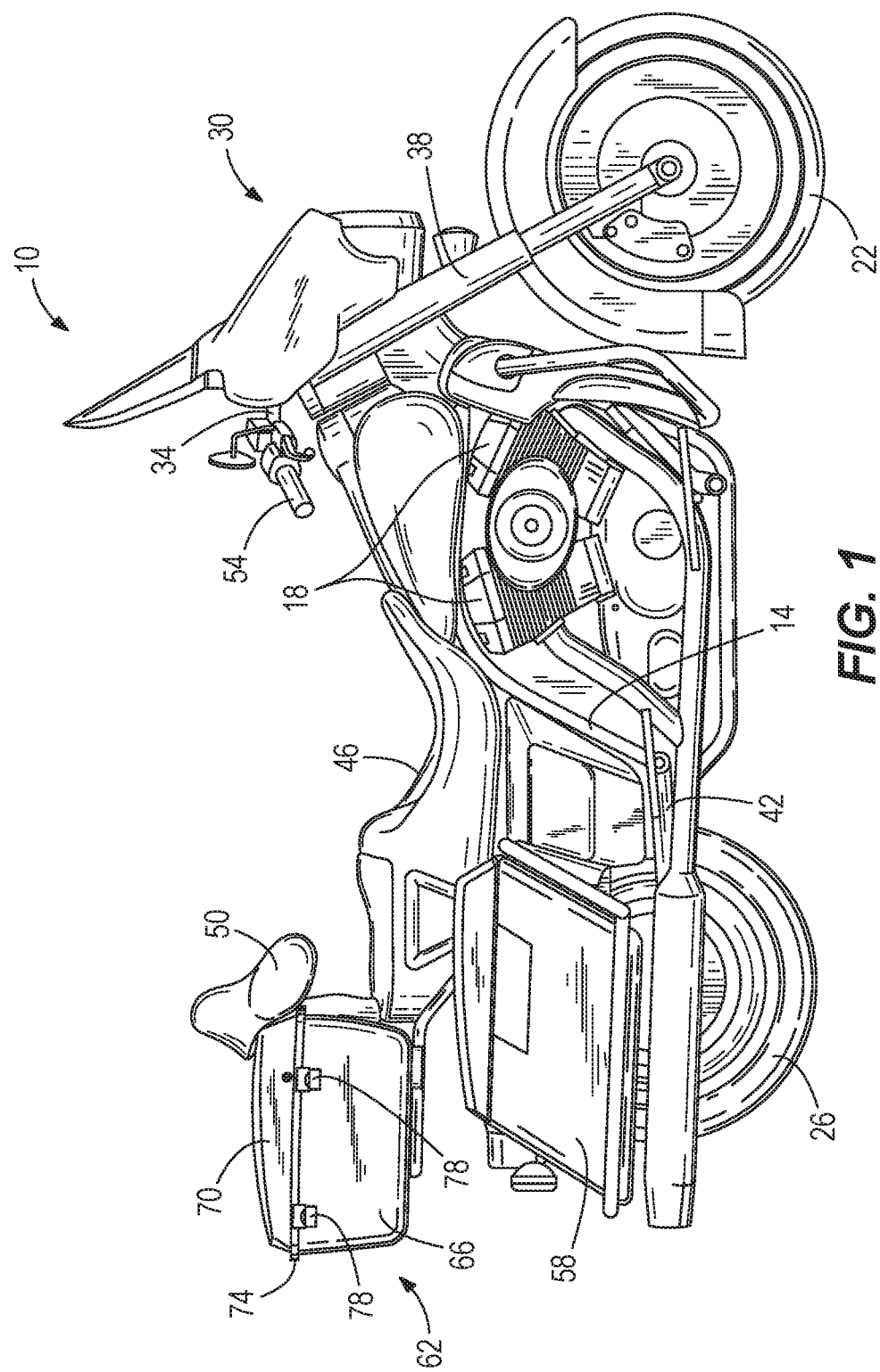
FIG. 1 is a side view of a motorcycle according to one embodiment of the invention.

FIG. 1 illustrates a motorcycle 10 including a frame 14, an engine 18, a single front wheel 22, and one rear wheel 26 positioned rearward of the front wheel 22. In particular, the front and rear wheels 22, 26 define a single track. The front wheel 22 is supported by a steering unit 30 including a handlebar 34 and a front fork 38. The rear wheel 26 is supported pivotably relative to the frame 14 by a swing arm 42. A seat 46 at least partially defining a seating area of the motorcycle 10 supports a primary rider (e.g., operator), and optionally an additional rider (e.g., pillion passenger). The seat 46 is positioned to support at least one rider between the front and rear wheels 22, 26. In the illustrated saddle configuration, the rider's and/or passenger's legs straddle the outside of the motorcycle 10, although other saddle configurations including those of conventional scooters with a footwell are optional. In short, aspects of the invention can apply to all types of saddle ride vehicles or any leaning or tilting vehicle, including but not limited to single-track two-wheeled vehicles such as motorcycles and scooters. In order to allow the rider to have steering control of the front fork 38 and the front wheel 22, a pair of hand grips 54 are provided at the distal ends of the handlebar 34. It is also noted that the handlebar 34 can be a single unitary element or an assembly of individual elements that allow motion to be transferred from the hand grips to the front fork. The rider of the motorcycle 10 is responsible for maintaining control and balance of the motorcycle 10 as the motorcycle 10 is of the type that is, in and of itself, not inherently stable and is subject to tipping over into a non-operational position on its side. Although stability is easily achievable in single-track vehicles by a rider at normal cruising speeds, even with moderate to large lean angles to navigate turns, slow speeds such as traffic jams, stop lights, parking lots, etc. demand attention to balance control, especially for newer riders, or those with shorter legs, lesser leg strength, etc.

The illustrated motorcycle 10 is a touring style "heavyweight" class of motorcycle and includes various luggage containers including a pair of saddlebags 58 positioned alongside left and right sides of the rear wheel 26 as well as a trunk 62 positioned rearward of the seat 46. In the illustrated construction, the trunk 62 is a Harley-Davidson TOUR-PAK® and is positioned directly behind the seat 46 of the motorcycle 10. However, it should be appreciated that the features described in detail below are not limited to use with a Harley-Davidson TOUR-PAK® and can be used with various motorcycle luggage containers, including other styles of trunks or top cases, saddlebags, etc. Aspects of the invention may also be applied to numerous other types and styles of motorcycles, scooters, and bicycles.

The illustrated trunk 62 includes a body 66 and a lid 70 that are coupled together with hinges 74. One or more latches 78 are used to retain the lid 70 in a closed position with respect to the body 66. In the shown embodiments, a gyroscopic rider assist device 82 is positioned within the trunk 62 in order to aid in balancing the motorcycle 10. In some embodiments, when unlatched, the lid 70 opens to provide selective access to the gyroscopic rider assist device 82 and a cargo volume jointly defined by the body 66 and the lid 70. In other embodiments, the trunk 62 solely encloses the gyroscopic rider assist device 82 and does not include a cargo volume. The trunk 62, in particular the body 66 and the lid 70, may constitute an enclosure for enclosing or containing the gyroscopic rider assist device 82. The trunk 62 may be the only enclosure for the gyroscopic rider assist device 82 (in which case the trunk 62 is suitably strengthened for containment), or the gyroscopic rider assist device 82 may be enclosed or contained within another separate enclosure within the trunk 62, so that a user is blocked from accessing moving parts of the gyroscopic rider assist device 82 when the lid 70 is opened. In the case that the gyroscopic rider assist device 82 is contained solely by the trunk 62, without a separate sub-enclosure, the trunk 62 may be a faux trunk that has the outward appearance of a cargo or luggage container, but that is in fact not operational as such. Not only may the gyroscopic rider assist device 82 take up all the available space, leaving the volume ineffective for cargo, but the trunk 62 may be rendered inoperative in the usual way. For example, the latches 78 and/or the hinges 74 may be permanently fixed closed, selectively openable when the gyroscopic rider assist device 82 is deactivated, or may be faux latches or faux hinges, that are not operable to open the lid 70 from the body 66. Although the illustrated embodiment focuses on the use of the trunk 62 as the enclosure for the gyroscopic rider assist device 82, with its position rearward of a pillion passenger seat, other variations are contemplated. For example, the motorcycle 10 may not have a pillion passenger seat, and the gyroscopic rider assist device 82, with suitable enclosure, may be positioned directly behind the seat 46, having a single rider seating position. In other constructions, the gyroscopic rider assist device 82, with suitable enclosure, may be positioned between the rear wheel 26 and the seat 46, for example, directly below the pillion passenger seating position of the seat 46. In some constructions, the gyroscopic rider assist device 82 is not positioned in the trunk 62, and may also be separate from all other luggage containers. The gyroscopic rider assist device 82 may be positioned forward of the seat 46, in the position normally occupied by the fuel tank of a conventional motorcycle (e.g., when applied to an electric vehicle or a vehicle having a non-conventional fuel tank).

Figure 2:
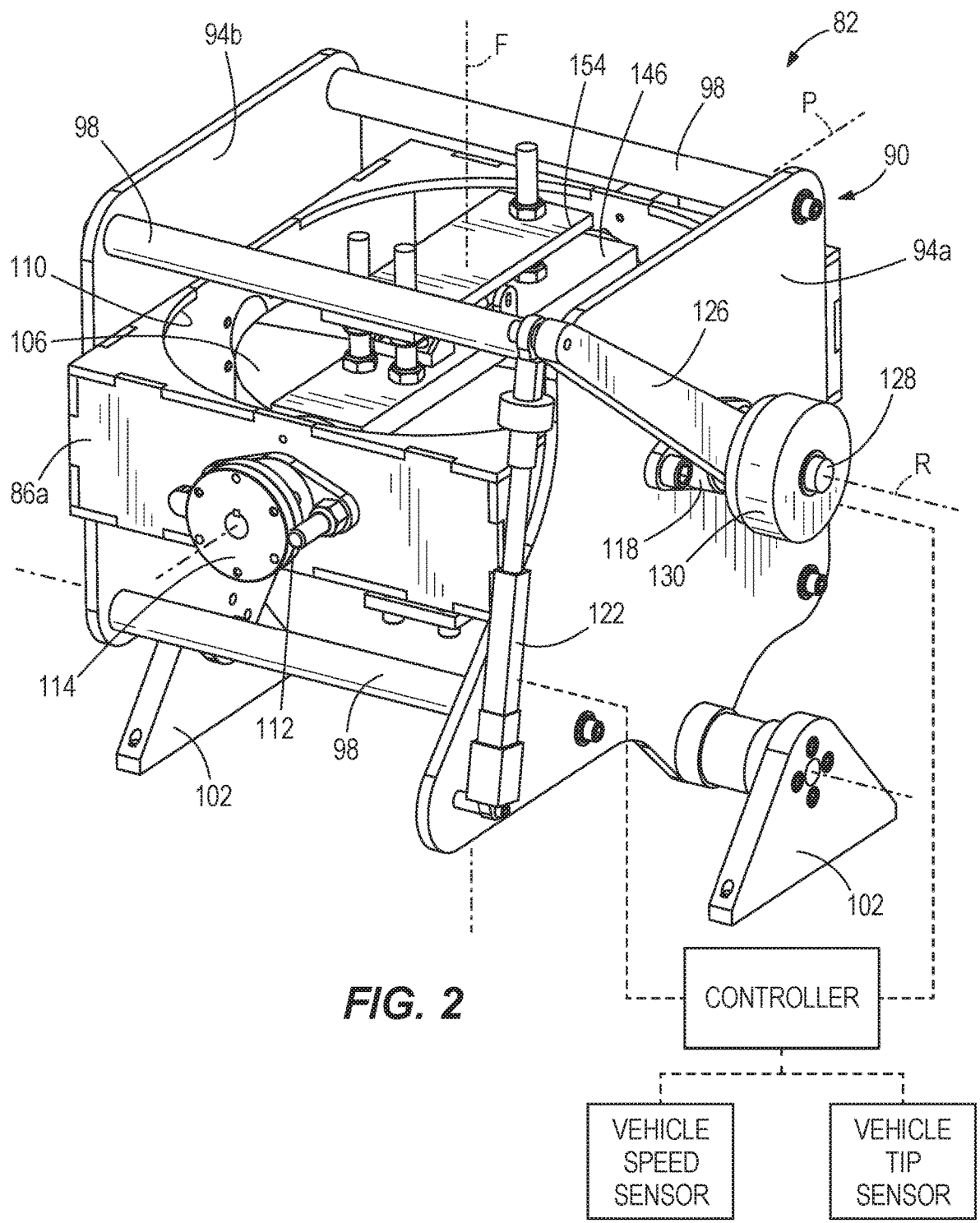
FIG. 2 is a perspective view of a gyroscopic rider assist device positioned in the luggage container of FIG. 1 in a stationary position.
Figure 3:
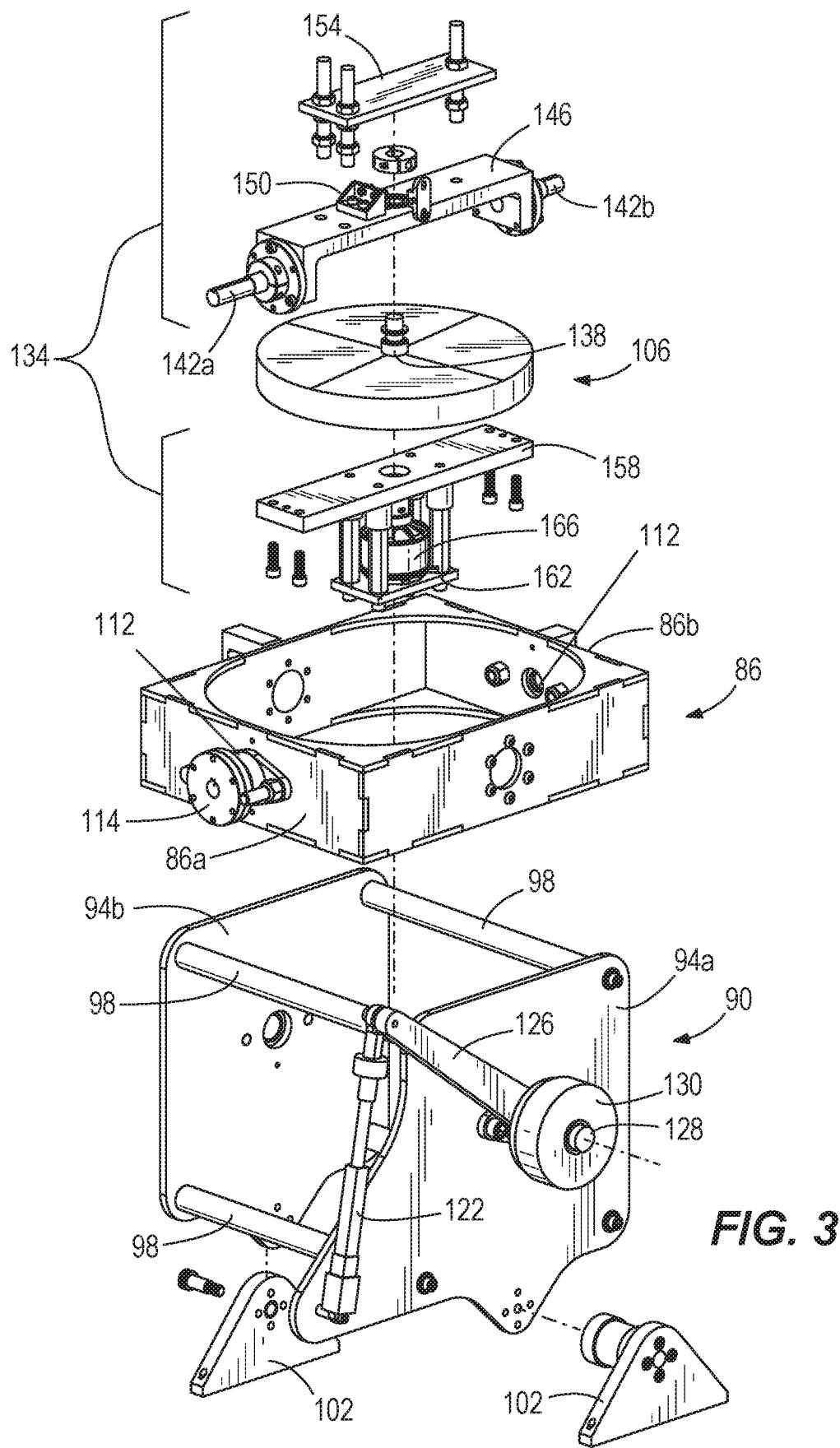
FIG. 3 is an exploded view of the gyroscopic rider assist device of FIG. 2.
Figure 4:
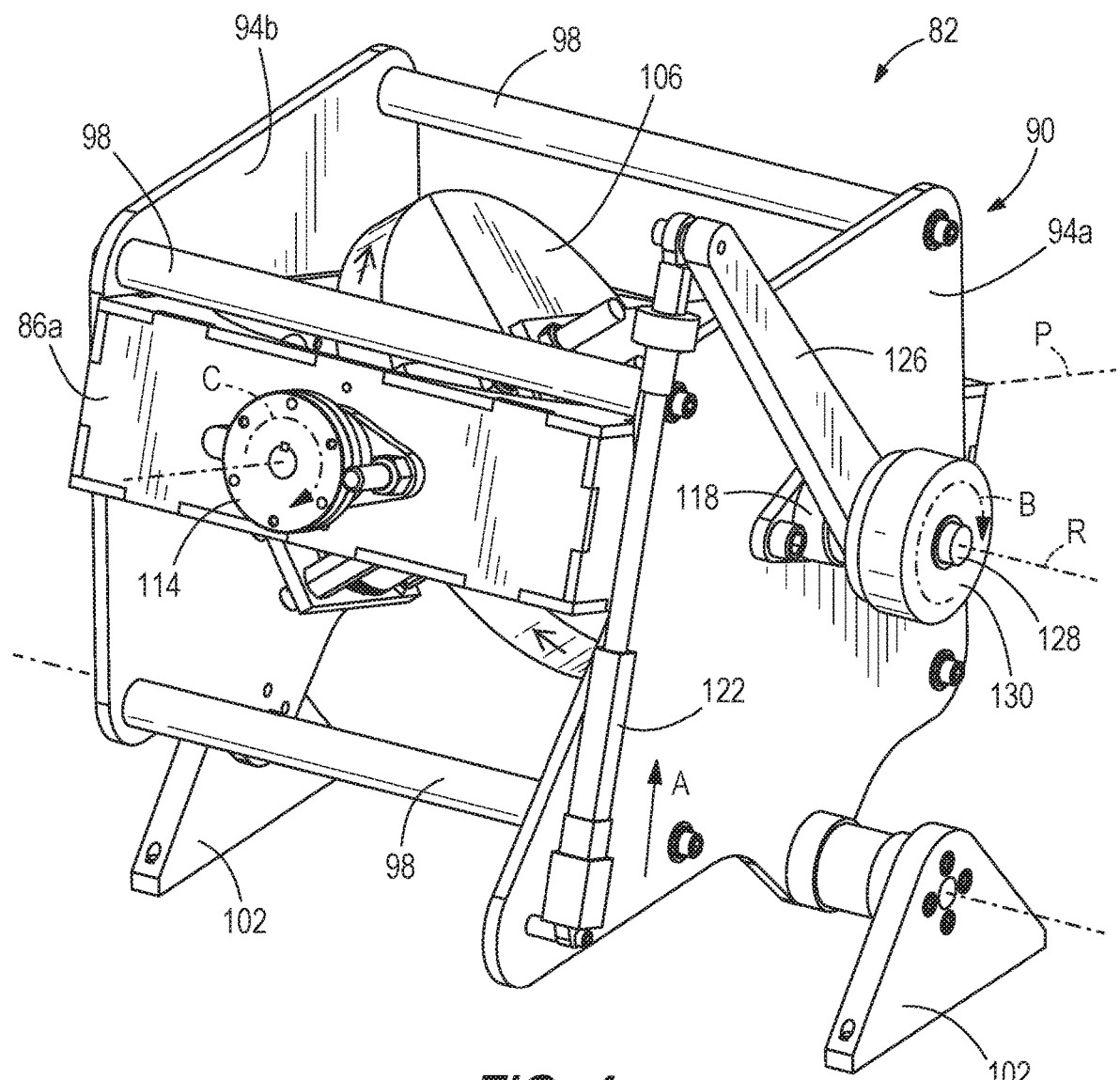
FIG. 4 is a perspective view of the gyroscopic rider assist device of FIG. 2 in an engaged position.

With reference to FIGS. 2-4, the gyroscopic rider assist device 82 is a single flywheel, two axis gyroscope. The device 82 includes a gimbal 86 positioned within a gimbal support frame 90 and rotatably supported by the frame 90 about a roll axis R. The gimbal 86 is pivotally supported by the frame 90 through a pair of bearings 118. One bearing 118 is provided on each of a pair of plates 94a, 94b of the frame 90. The two plates 94a, 94b coupled by rods 98 extending between the plates 94a, 94b. Feet 102 are coupled to a lower portion of the frame 90 in order to support the gyroscopic assist device 82 on a surface (e.g., a base of the trunk 62). In alternative embodiments (not shown), the frame 90 may include additional supporting structure.

The gimbal 86 has a rectangular outer profile and includes an aperture 110 operable to house a flywheel assembly having a flywheel 106 among other components, discussed further below. A pair of bearings 112 are positioned on opposing sides 86a, 86b of the gimbal 86 about a precession axis P, which is perpendicular to the roll axis R. The bearings 112 pivotally couple the gimbal 86 to the flywheel assembly, such that the flywheel assembly including the flywheel 106 is free to pivot, or "precess" about the precession axis P. Specifically, when the gimbal 86 pivots about the roll axis R (with the flywheel spinning), the flywheel 106 is forced to roll with the gimbal 86 since the precession axis P is defined by and fixed with respect to the gimbal 86. According to the laws of physics, rolling of the gimbal 86 about the roll axis R results in precession of the flywheel 106 about the precession axis P within the gimbal 86 as a balanced moment reaction. Precession of the flywheel 106 relative to the gimbal 86 is measured by a precision angle encoder positioned adjacent one of the bearings 112 and provided in electrical communication with the controller. The flywheel 106 can be held in a high speed spinning state throughout operation of the motorcycle 10 so that it is in a ready state at all times, regardless of whether the gyroscopic rider assist device 82 may be temporarily toggled to an inoperative state as described below. A dedicated motor 166 spins the flywheel 106, and the flywheel rotational speed may be monitored by a sensor (e.g., tachometer 150). Operational speeds can vary, especially with the selected mass of the flywheel 106, but may be on the order of 10,000 to 20,000 rpm, or in some constructions up to 30,000 rpm or 40,000 rpm. When configured to operate in the higher range of speeds listed above, the flywheel may be maintained in a partial vacuum environment.

In one construction, the gyroscopic rider assist device 82 is oriented so that the flywheel 106 spins in a plane that is parallel to earth when the motorcycle 10 is upright. Further, the roll axis R is in line with the longitudinal direction of the motorcycle 10, and the precession axis P is oriented transverse to the longitudinal direction of the motorcycle 10. However, the gyroscopic rider assist device 82 can be provided in other orientations on the motorcycle 10, in consideration of the desired effects on pitch, roll, or yaw, including combinations thereof. For example, the gyroscopic rider assist device 82 is oriented in some constructions so that the flywheel 106 spins in a plane that is parallel to those of the front and rear wheels 22, 26. In another example, the illustrated gyroscopic rider assist device 82 is instead mounted in an orientation that is rotated 90 degrees within a horizontal plane parallel to earth and operated to provide pitch control (e.g., controlling pitching motion associated with brake dive and/or acceleration squat). Yet other examples are discussed below.

Figure 5:
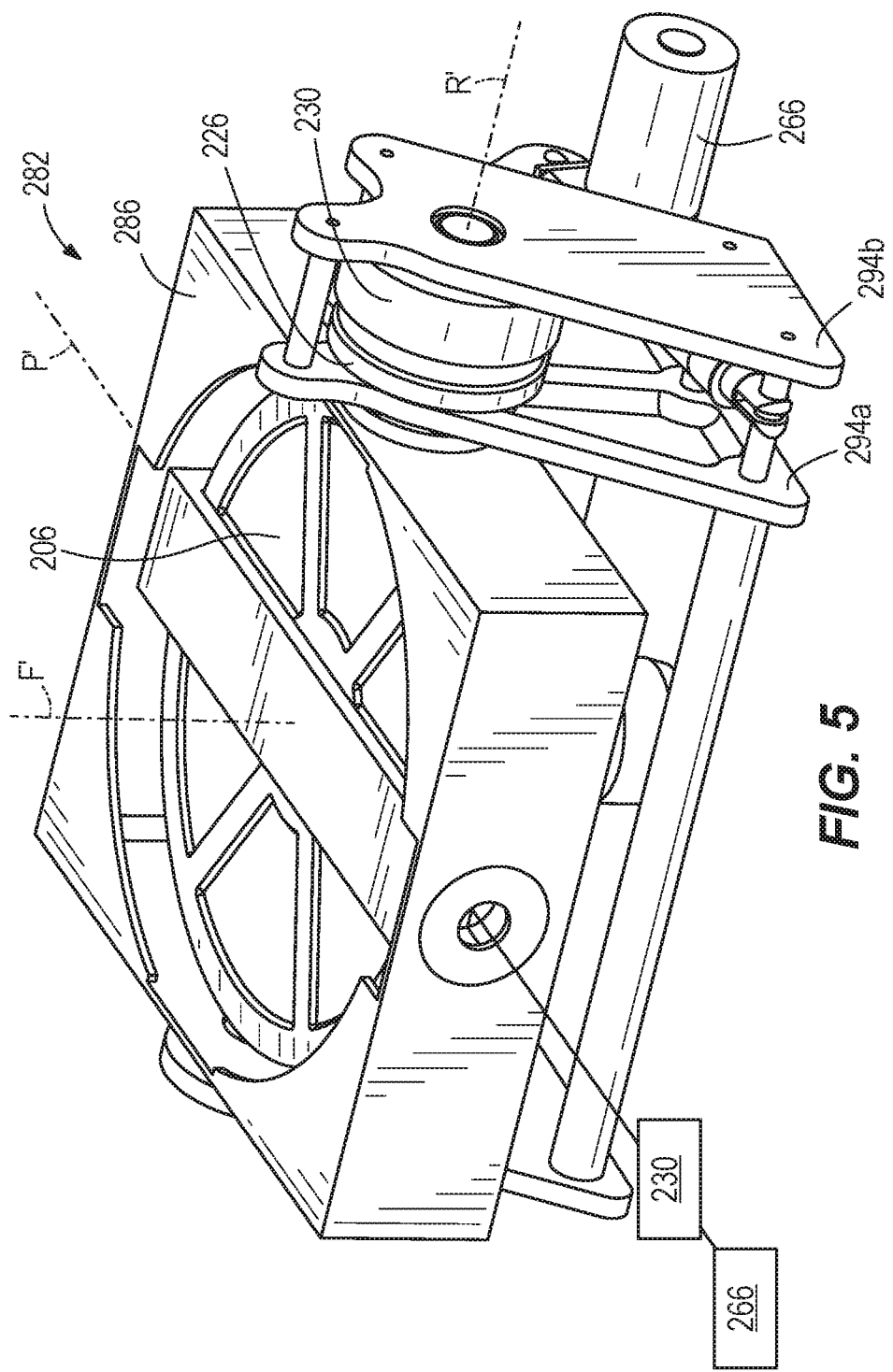
FIG. 5 is a perspective view of an alternative gyroscopic rider assist device positioned in the luggage container of FIG. 1.

The gyroscopic rider assist device 82 further includes an actuator 122 coupled to the frame 90 (e.g., having a fixed end secured to an outer side of the plate 94a). The actuator 122 has a movable end and the movable end is coupled through a force transmission mechanism to the gimbal 86. The force transmission mechanism may include a lever arm 126 and an axle or shaft 128 extending through one of the bearings 118 on the roll axis R. The shaft 128 can be directly or indirectly fixed to the gimbal 86. As shown in FIGS. 2-4, the actuator 122 is a linear actuator that is operable when energized to extend/retract linearly, although other types of actuators, other types of force transmission mechanisms, and combinations thereof are also contemplated. Movement of the actuator 122 translates to movement of the lever arm 126 and subsequently rotates the gimbal 86 about the roll axis R. In other words, the actuator 122 drives the gimbal 86 relative to the gimbal support frame 90 to trigger a precession reaction of the flywheel 106 relative to the gimbal 86 so that a corrective moment or torque is generated on the motorcycle 10. The linear actuator 122 shown in FIGS. 2-4 is a solenoid linear actuator electrically powered by an electrical power source (e.g., battery and/or charging system). In alternative embodiments, the actuator 122 may be powered by alternative means (e.g., hydraulically, pneumatically, etc.). The actuator 122 may be a motor in some constructions, rather than a linear actuator, and the force transmission mechanism can, but need not include a separate lever arm 126 for actuating the gimbal 86. FIG. 5, discussed below, relates to one such exemplary construction.

With continued reference to FIGS. 2-4, the force transmission mechanism between the actuator 122 and the gimbal 86 includes a clutch 130 operable for selective engagement and disengagement. The clutch is positioned on the frame 90, outside the plate 94a, at the roll axis R, but other positions that provide the appropriate function are optional. When engaged, the clutch 130 enables the force transmission mechanism so that the gyroscopic rider assist device 82 is activated and the output of corrective moment can be controlled by controlling the actuator 122. Alternatively, when the clutch 130 is disengaged it decouples the force transmission mechanism between the actuator 122 and the gimbal 86 to selectively deactivate the gyroscopic rider assist device 82. In one construction, one part of the clutch 130 is fixed with an end of the lever arm 126 and another part of the clutch 130 is fixed with the gimbal shaft 128. The clutch 130 can be electromagnetically controlled, although other mechanisms for clutch operation are optional. When the gyroscopic rider assist device 82 is deactivated by the clutch 130, the gimbal 86 is simply allowed to move freely within the gimbal support frame 90 and remain level to earth if and when the motorcycle 10 leans relative to earth during operation. As such, when the clutch 130 is disengaged, the gyroscopic rider assist device 82 is not operable to assist in balancing the motorcycle 10. However, this is of course a benefit for a rider at cruising speeds who would like to control the lean angle of the motorcycle naturally. The clutch 130 can be a toothed clutch that provides a positive engagement or locking. In alternative embodiments, a more conventional friction plate clutch, such as a single plate clutch or a multi-plate clutch, may be used. Additionally, the clutch 130 may be placed in various different positions along the roll axis R. For example, the clutch 130 may be positioned at the actuator 122 (i.e., in or on the actuator). In the case of a rotary motor as the actuator for rolling the gimbal 86, the clutch 130 may be provided integrally with the motor. The gyroscopic rider assist device 82 is shown with a single actuator 122 on one side only, but tandem actuators are provided to flank the gimbal 86 in other constructions in order to share the actuation load. Further, it is contemplated that one, some or all of: the actuator 122, the force transmission mechanism (lever arm 126 or other), and the clutch 130 can be provided on an inside of the frame 90 adjacent the gimbal 86.

The gyroscopic rider assist device 82 additionally includes a controller in communication with the clutch 130, among other elements. The controller is programmed to automatically actuate the clutch 130 to decouple the force transmission mechanism to selectively deactivate the gyroscopic rider assist device 82. Therefore, the motorcycle 10 is allowed to lean freely when traveling above a threshold speed. Additionally, the controller may automatically actuate the clutch 130 to couple the force transmission mechanism to selectively activate the gyroscopic rider assist device 82 and aid in balancing the motorcycle 10 when traveling less than or equal to the threshold speed. The travel speed of the motorcycle 10 can be measured directly by a wheel speed sensor that reports a signal to the controller. Alternately, the travel speed may be obtained by a global positioning device (GPS), calculated from engine speed and transmission ratios, etc. As discussed in further detail below, the threshold speed value can be stored in a memory. The threshold speed value may be user adjustable in some constructions. The threshold speed, and automatic switching of the gyroscopic rider assist device 82, is one example of activation/deactivation upon transition from a first condition of the motorcycle 10 to a second condition of the motorcycle, while others are possible. These include, but are not limited to, simple user on/off control, and automatic roll or lean assist for cornering when the controller determines inadequate rider-initiated lean angle of the motorcycle 10 in one or more scenarios (e.g., selectively activated above a threshold speed and/or able to be disabled by the rider). Thus, it should be appreciated that the gyroscopic rider assist device 82 is not strictly limited to operations that urge the motorcycle 10 to the full upright condition at low speeds, although it is a particularly useful exemplary implementation. The selective activation of the gyroscopic rider assist device 82 can be toggled as part of two or more rider selectable drive modes of the motorcycle 10, for example through a display or infotainment system.

Returning to the flywheel assembly, the flywheel 106 is a disc supported within the gimbal 86 for precession about the precession axis P. Additionally, the flywheel 106 rotates about a central flywheel axis F (e.g., clockwise from above), supported by a bracket assembly 134 within the gimbal 86. The bracket assembly 134 couples to the flywheel 106 via an axle or shaft 138 (FIG. 3) of the flywheel 106 on the flywheel axis F. The bracket assembly 134 is supported rotatably within the gimbal 86 via a first shaft 142a and a second shaft 142b along the precession axis P. As such, the bracket assembly 134 captively rolls with the gimbal 86 about the roll axis R. Because the flywheel 106 is not secured to the gimbal 86 or the frame 90 along the roll axis R, the flywheel 106 is free to precess relative to the gimbal 86 about the precession axis P while spinning about the flywheel axis F in the bracket assembly 134 and rolling with the gimbal about the roll axis R.

The bracket assembly 134 includes a first or upper bracket 146 coupling the flywheel 106 to the gimbal 86 along the precession axis P. The first and second shafts 142a, 142b engage opposing sides 86a, 86b of the gimbal 86. Specifically, the shafts 142a, 142b couple to the bearings 112 on the gimbal 86. An upper plate 154 coupled to the upper bracket 146 can extend over the end of the flywheel shaft 138 and the tachometer 150. A second or lower bracket 158 is fixed to the upper bracket 146 at distal ends thereof, leaving a gap between the brackets 146, 158 to accommodate the flywheel 106 therebetween. The lower bracket 158 includes a motor carriage 162 operable to house the flywheel motor 166. However, in alternative embodiments, the motor 166 may be positioned in alternative locations.

The gyroscopic rider assist device 82 may be actuated manually or automatically between active and inactive operational states, so that it is effective only when a rider needs assistance stabilizing the motorcycle 10, such as at low speeds. In some constructions, the gyroscopic rider assist device 82 is automatically actuated, such that the device 82 is actuated in response to the motorcycle 10 no longer exceeding the threshold speed. Specifically, when the motorcycle 10 decelerates below the threshold speed, the controller actuates the clutch 130 to couple the force transmission mechanism, which activates the gyroscopic rider assist device 82. The threshold speed may be set to a very low speed, e.g., under 3 mph such as 2 mph, in which the engine 18 is likely to be disconnected from the wheels. Disengagement or opening of a clutch between the engine 18 and transmission, e.g., by the rider when coming to a stop, may also be a condition for activating the gyroscopic rider assist device 82 with the clutch 130. As shown in FIG. 4, the actuator 122 is energized and moves in a linear direction A, applying an actuation torque B to the gimbal 86, which carries the flywheel 106 with it about the roll axis R. As the gimbal 86 and flywheel 106 roll about the roll axis R, a rotational force C is exerted on the flywheel 106, causing the flywheel 106 to precess about the precession axis P. Precession is caused by the change of angular momentum of the flywheel 106. Due to the possible combinations of the flywheel's mass moment of inertia and speed of rotation, the flywheel 106 has a substantial or significant amount of angular momentum. Therefore, when the flywheel 106 is acted on by the actuation torque B about the roll axis R, there must be a corresponding precession of the flywheel 106 and associated reaction torque. The reaction torque, which is equal in magnitude to the actuation torque B, is exerted onto the motorcycle 10 for correction. The controller can control the input to the actuator 122 in response to a signal from a vehicle tip sensor, which monitors for tipping of the motorcycle 10. The tip sensor reports at least the direction and magnitude of the tipping for calculation of an appropriate corrective action by the gyroscopic rider assist device 82. Rate of change of tipping may also influence the response of the gyroscopic rider assist device 82. The controller can be programmed with an algorithm (e.g., executed instructions stored in a memory of or in communication with the controller) that takes into account the mass of the flywheel 106 and its speed of rotation, which can be verified by the tachometer 150, as a signal from the tachometer 150 is reported to the controller. The memory can also store data, such as the flywheel mass, motorcycle mass, fixed or adjustable settings, etc.

Although the response of the gyroscopic rider assist device 82 is carefully calculated and automatically implemented by the controller so as to be as near as possible to imperceptible by the rider (who merely notices that the motorcycle 10 is extremely stable at low speeds), the threshold speed for enabling/disabling the gyroscopic rider assist device 82 may be a rider adjustable parameter, for example through a settings menu of an infotainment system, or other implemented control. Furthermore, the gyroscopic rider assist device 82 can be toggled off altogether by the rider so that it will not be effective even below the threshold speed. When toggled off by the rider, the gyroscopic rider assist device 82 may be disabled by the clutch 130, while the flywheel 106 continues spinning, or the flywheel 106 may be stopped via ceasing power to the motor 166—the latter being a more permanent off condition due to the required time to spin the flywheel 106 up to operational speed from rest. This or other types of control of the motor 166 can be achieved through instructions and outputs of the controller.

FIG. 5 displays another gyroscopic rider assist device 282. Although not shown in this embodiment, the gyroscopic rider assist device 282 may be similar to the gyroscopic rider assist device 82 described above with reference to FIGS. 2-4. The illustrated gyroscopic rider assist device 282 is similar to the gyroscopic rider assist device 82 and includes like parts. Reference is hereby made to the description of the gyroscopic rider assist device 82 shown in FIGS. 2-4 for description of features and elements of the gyroscopic rider assist device 282 not specifically included below.

The illustrated gyroscopic rider assist device 282 includes a gimbal 286 positioned within a frame and rotatably supported by the frame about a roll axis R'. The gimbal 286 supports a flywheel 206, such that the flywheel 206 is free to rotate about a flywheel axis F', roll with the gimbal 286 about the roll axis R', and precess about a precession axis P'. The frame includes two plates 294a, 294b supporting a servomotor 266 and a clutch 230 sandwiched between the plates 294a, 294b. More specifically, a lever arm 226 coupled to an output of the servomotor 266 extends to a first side of the clutch 230. The clutch 230 selectively couples the lever arm 226 with the gimbal 286 such that the clutch 230 controls the active/inactive state of the gyroscopic rider assist device 282.

As also shown in FIG. 5, it is possible to provide an actuator such as a servomotor 266 to move the flywheel 206 and bracket assembly 134 relative to the gimbal 286 (about the axis labeled as the precession axis P'). In particular, this enables actuation of the device 282 by actively driving the orientation of the flywheel 206, the reaction of which is the precession of the gimbal 286 about the axis labeled as the roll axis R'. The servomotor 266 or other actuator moves along with the flywheel 206 and bracket assembly 134 with respect to the gimbal 286. The device 282 can feature either or both of the servomotors 266, depending on the desired orientation and moment-assistance regime. Optionally, both can be coupled via clutches 230 to allow selective disengagement. With multiple actuators, the device 282 can provide multi-axis moment assistance, either discretely or in combination with each other (e.g., one or both of vehicle pitch and roll/tilt). However, it is also possible for the device 282 to be configured to provide assisting yaw moments, either alone or in combination with other assisting moments. In some constructions, the device 282 can switch between pitch correction mode and roll/tilt correction mode by switching which one of the two clutches 230 is engaged and which is disengaged. The various operations and mode switching of the device 282 can be automatically carried out by the controller on an as-needed basis and/or rider controlled as described above.

Various features and advantages of the disclosure are set forth in the following claims.

What is claimed is:

1. A tilting vehicle comprising:
 a frame;
 a front wheel coupled to the frame;
 a rear wheel coupled to the frame and positioned rearward of the front wheel in a longitudinal direction;
 a seating area including at least one seat positioned to support a rider between the front wheel and the rear wheel; and
 a gyroscopic rider assist device provided within an enclosure behind the seating area and above the rear wheel, the gyroscopic rider assist device including:
  a gimbal support frame fixed with respect to the frame,
  a gimbal rotatably supported by the gimbal support frame for rotation about a roll axis, and
  a flywheel supported for rotation about a flywheel axis by a bracket, wherein the bracket is rotatably supported by the gimbal about a precession axis.

2. The tilting vehicle of claim 1, further comprising an actuator coupled to the gimbal through a force transmission mechanism and operable to drive the gimbal relative to the gimbal support frame to trigger a precession reaction of the flywheel relative to the gimbal so that a corrective moment is generated on the vehicle.

3. The tilting vehicle of claim 2, further comprising a clutch to decouple the force transmission mechanism to selectively deactivate the gyroscopic rider assist device by allowing the gimbal to move freely within the gimbal support frame to remain level as the vehicle leans during operation.

4. The tilting vehicle of claim 3, wherein the clutch is a toothed clutch.

5. The tilting vehicle of claim 3, wherein the actuator is a linear actuator and the force transmission mechanism includes a lever arm, wherein the clutch is positioned between the lever arm and the gimbal.

6. The tilting vehicle of claim 3, further comprising a controller programmed to actuate the clutch to decouple the force transmission mechanism when the vehicle exceeds a threshold speed stored in a memory.

7. The tilting vehicle of claim 6, wherein the threshold speed is user adjustable.

8. The tilting vehicle of claim 6, wherein the controller is programmed to disregard the threshold speed and maintain the gyroscopic rider assist device in the deactivated state in response to a user input to toggle the gyroscopic rider assist device off.

9. The tilting vehicle of claim 3, further comprising a second actuator between the bracket and the gimbal and operable to reorient the flywheel with respect to the bracket, and a second clutch to decouple the second actuator.

10. The tilting vehicle of claim 2, wherein the actuator is a rotary actuator.

11. The tilting vehicle of claim 1, wherein the flywheel is the one and only flywheel of the gyroscopic rider assist device.

12. A tilting vehicle comprising:
a frame;
a front wheel coupled to the frame;
a rear wheel coupled to the frame and positioned rearward of the front wheel in a longitudinal direction;
a gyroscopic rider assist device operable to output a corrective moment on the vehicle in response to an input from an actuator; and
a clutch provided between the actuator and the gyroscopic rider assist device to selectively deactivate the gyroscopic rider assist device upon transition from a first condition of the vehicle to a second condition of the vehicle,
wherein the gyroscopic rider assist device includes
a gimbal support frame fixed with respect to the frame,
a gimbal rotatably supported by the gimbal support frame for rotation about a roll axis, and
a flywheel supported for rotation about a flywheel axis by a bracket, wherein the bracket is rotatably supported by the gimbal about a precession axis.

13. The tilting vehicle of claim 12, further comprising a second actuator between the bracket and the gimbal and operable to reorient the flywheel with respect to the bracket, and a second clutch to decouple the second actuator.

14. The tilting vehicle of claim 12, wherein the flywheel is the one and only flywheel of the gyroscopic rider assist device.

15. The tilting vehicle of claim 12, further comprising a controller and a memory, the controller programmed to actuate the clutch to deactivate the gyroscopic rider assist device in response to the transition from the first condition to the second condition in accordance with instructions stored in the memory.

16. The tilting vehicle of claim 15, wherein the transition to the second condition of the vehicle occurs upon the vehicle exceeding a threshold speed value stored in the memory.

17. The tilting vehicle of claim 16, wherein the threshold speed value in the memory is user adjustable.

18. A tilting vehicle comprising:
a frame;
a front wheel coupled to the frame;
a rear wheel coupled to the frame and positioned rearward of the front wheel in a longitudinal direction;
a gyroscopic rider assist device operable to output a corrective moment on the vehicle in response to an input from an actuator; and
a toothed clutch provided between the actuator and the gyroscopic rider assist device to selectively deactivate the gyroscopic rider assist device upon transition from a first condition of the vehicle to a second condition of the vehicle.

19. A tilting vehicle comprising:
a frame;
a front wheel coupled to the frame;
a rear wheel coupled to the frame and positioned rearward of the front wheel in a longitudinal direction;
a gyroscopic rider assist device operable to output a corrective moment on the vehicle in response to an input from a linear actuator; and
a clutch provided between the actuator and the gyroscopic rider assist device to selectively deactivate the gyroscopic rider assist device upon transition from a first condition of the vehicle to a second condition of the vehicle.

20. A tilting vehicle comprising:
a frame;
a front wheel coupled to the frame;
a rear wheel coupled to the frame and positioned rearward of the front wheel in a longitudinal direction;
a gyroscopic rider assist device operable to output a corrective moment on the vehicle in response to an input from an actuator;
a clutch provided between the actuator and the gyroscopic rider assist device to selectively deactivate the gyroscopic rider assist device upon transition from a first condition of the vehicle to a second condition of the vehicle; and
a controller and a memory, the controller programmed to actuate the clutch to deactivate the gyroscopic rider assist device in response to the transition from the first condition to the second condition in accordance with instructions stored in the memory.

21. The tilting vehicle of claim 20, wherein the transition to the second condition of the vehicle occurs upon the vehicle exceeding a threshold speed value stored in the memory.

22. The tilting vehicle of claim 21, wherein the threshold speed value in the memory is user adjustable.

* * * * *